United States Patent [19]

Langley

[11] Patent Number: 4,938,817

[45] Date of Patent: Jul. 3, 1990

[54] METHOD OF FORMING BONDED SEAMS OF SPUNBONDED POLYOLEFIN FABRIC AND CLEANROOM GARMENTS INCLUDING SUCH SEAMS

[75] Inventor: John D. Langley, Guntersville, Ala.

[73] Assignee: Kappler Safety Group, Guntersvile, Ala.

[21] Appl. No.: 292,504

[22] Filed: Dec. 30, 1988

[51] Int. Cl.⁵ .................... B29C 65/08; B32B 31/20
[52] U.S. Cl. ................................. 156/73.1; 2/275;
    156/73.4; 156/157; 156/223; 156/227; 156/290
[58] Field of Search .................. 156/73.1, 73.4, 157,
    156/290, 227, 203, 217, 223, 380.1, 466, 580.2;
    428/57, 62; 2/275

[56] References Cited

U.S. PATENT DOCUMENTS

| | | | |
|---|---|---|---|
| 3,166,458 | 1/1965 | Chinn et al. | 156/157 |
| 4,490,199 | 12/1984 | Dunning | 156/157 |
| 4,670,073 | 6/1987 | Langley | 156/73.1 |
| 4,683,593 | 8/1987 | Langley | 2/82 |
| 4,737,212 | 4/1988 | Emrich et al. | 156/157 |

*Primary Examiner*—Michael Wityshyn
*Attorney, Agent, or Firm*—Phillips & Beumer

[57] ABSTRACT

Bonded seams for joining nonwoven, spunbonded polyolefin fabric to itself are prepared by overlapping of edge regions of the fabric with linen sides of the fabric in contact with one another and first applying heat and pressure along a seam line by means of ultrasonic energy and an embossed wheel, giving a lightly bonded strip. The strip is then folded against an adjacent surface, and heat and pressure are applied from the opposite side of the fabric and over the underlying folded-over strip. This procedure in effect merges the bond produced by the second application of heat and pressure with the first bond, giving a strong bond. Cleanroom and protective garments may be fabricated to include such seams, with the side of the seamed fabric that has a remaining cut edge at the seam being disposed on the inside of the garment. Such garments avoid release of microscopic particles such as occurs for stitched seams.

3 Claims, 2 Drawing Sheets

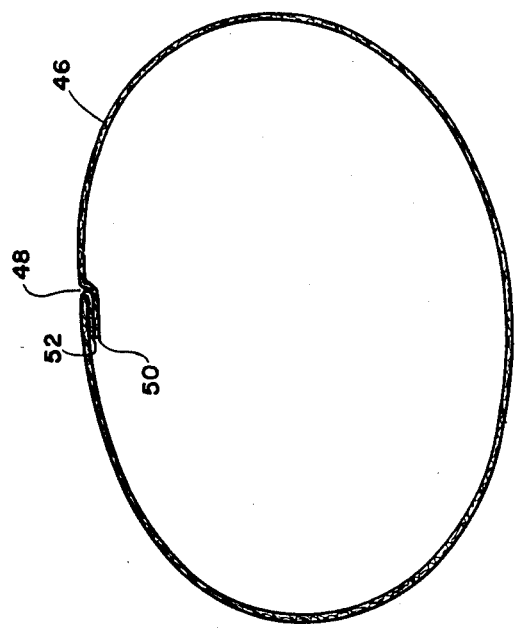
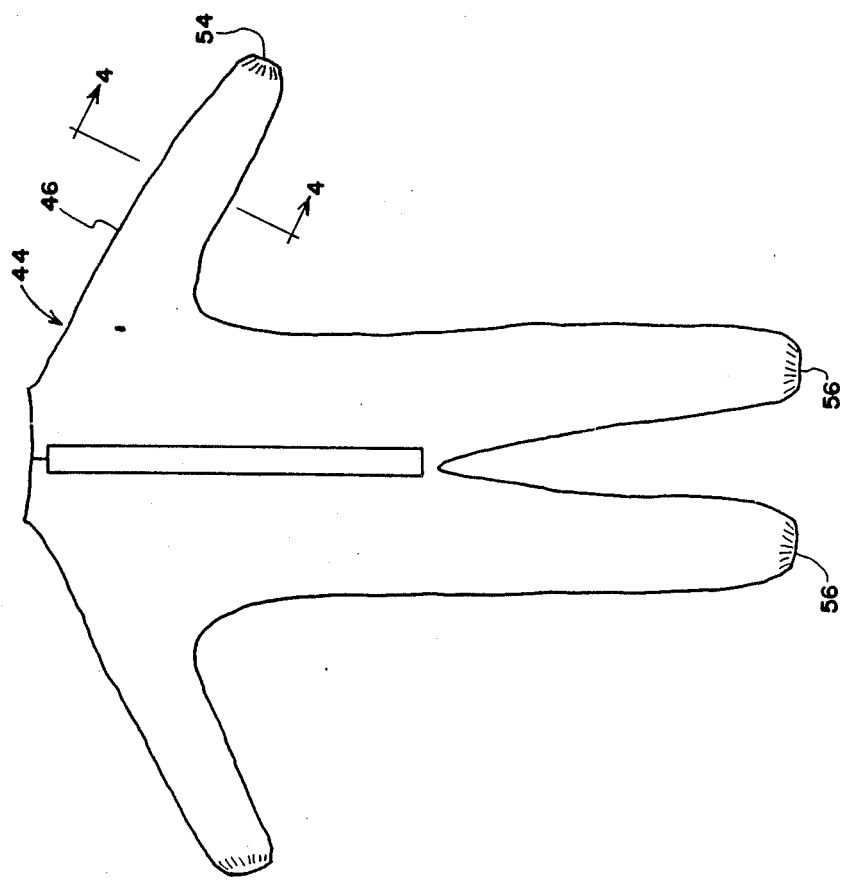

METHOD OF FORMING BONDED SEAMS OF SPUNBONDED POLYOLEFIN FABRIC AND CLEANROOM GARMENTS INCLUDING SUCH SEAMS

FIELD OF THE INVENTION

This invention relates to methods of seaming spunbonded synthetic fabrics and to the preparation of cleanroom garments from such fabrics.

BACKGROUND OF THE INVENTION

Cleanroom environments are becoming increasingly required for certain industrial processes such as fabrication of semiconductor devices that are extremely sensitive to particle contamination. In some cases, submicron particles can produce defects hat may result in rejection or failure of the product. Measure normally used to minimize particle contamination in cleanrooms, in addition to scrupulous cleanliness, include filtration of room air, regulation of temperature and humidity, and requiring workers in the room to wear special outer garments that provide a barrier to the release of particles from clothing and the human body.

One of the best available fabrics for cleanroom garments is nonwoven, spunbonded polyolefin material manufactured and marketed by E. I. du Pont de Nemours and Company under the trademark Tyvek ™. This fabric provides an effective barrier to transmission of particles from the wearer or his clothing, and it is amenable to being cleaned to an extent that its surfaces are virtually free of particles. Tyvek[198] fabric, however, presents a problem in that cut edges or needle holes produced in stitching of seams may emit microscopic fiber particles in sufficient quantity to cause increased rejects. This source of contamination could be avoided by use of bonded, rather than stitched, seams in preparation of garments, with bonded seams that include folded-over edges being located on the inside of the garment. Forming bonded seams of this type has not proven feasible to date, however, owing to the fact that Tyvek ™ is not directly heat-bondable to another piece of the same material, this being indicated by its manufacturer When one attempts to weld the seam together in an ordinary technique such as by a continuous application of heat and pressure along the seam, the material undergoes a migration or change in composition, becoming hard and brittle.

Applicant's prior patent, U.S. Pat. No. 4,683,593, discloses the preparation of bonded seams of a composite material having a layer of Tyvek ™ and a layer of a film such as polyethylene, the seam being formed by continuous application of heat and intermittent application of pressure along the path of the seam. While effective for composite fabrics of the type described, this method, when applied to bonding Tyvek ™ to itself, produces a seam that has marginal strength and exposed cut edges on both sides of the fabric, thus reducing its effectiveness for cleanroom garment applications.

SUMMARY OF THE INVENTION

The present invention is directed to forming a bonded seam of nonwoven, spunbonded polyolefin fabric by means of a two-step bonding procedure. In the first step, heat is applied continuously, and pressure is applied intermittently along a seam line adjacent the fabric edge, with the smoother or "linen" sides of the pieces of fabric to be seamed facing one another, producing a weak bond. The resulting lightly bonded strip is then folded over, and heat and pressure are applied as before from the linen side of the fabric and overlapping the previously folded over, weakly bonded strip. This method converts the weak peel-type seam obtained in the first application of heat and pressure into a shear seam with relatively high strength such as to enable fabrication of garments with sturdy and reliable seams. In fabrication of cleanroom garments where cut edges of the fabric are to be avoided o the outside of the garment, the rougher side of the fabric, on which all cut edges of the seamed fabric are located after bonding, is disposed on the inside of the garment so as to virtually eliminate such edges as a source of external contamination. Cleanroom garments embodying the invention provide an effective barrier to release into the environment of microscopic particles from the human body and from inner clothing, thus facilitating the achievement of very low particle counts for stringent cleanroom environments.

It is, therefore, an object of this invention to provide a method of preparing seams of nonwoven, spunbonded polyolefin fabric bonded to itself.

Yet another object is to provide a method of forming high strength bonded seams of such fabric.

Another object is to provide a method of fabricating cleanroom garments from such fabric.

Still another object is to provide cleanroom garments that provide an effective barrier to passage therethrough of microscopic particles and that have any potential sources of such particles located on the inside of the garment.

Another object is to provide cleanroom garments that are amenable to processing in special cleanroom laundering facilities.

Other objects and advantages of the invention will be apparent in the following detailed description and claims appended hereto.

BRIEF DESCRIPTION OF THE DRAWINGS

FIG. 3 is a view showing a cleanroom suit embodying the invention.

FIG. 4 is a sectional view along line 4—4 of FIG. 3.

DESCRIPTION OF THE PREFERRED EMBODIMENT

Figure 2:
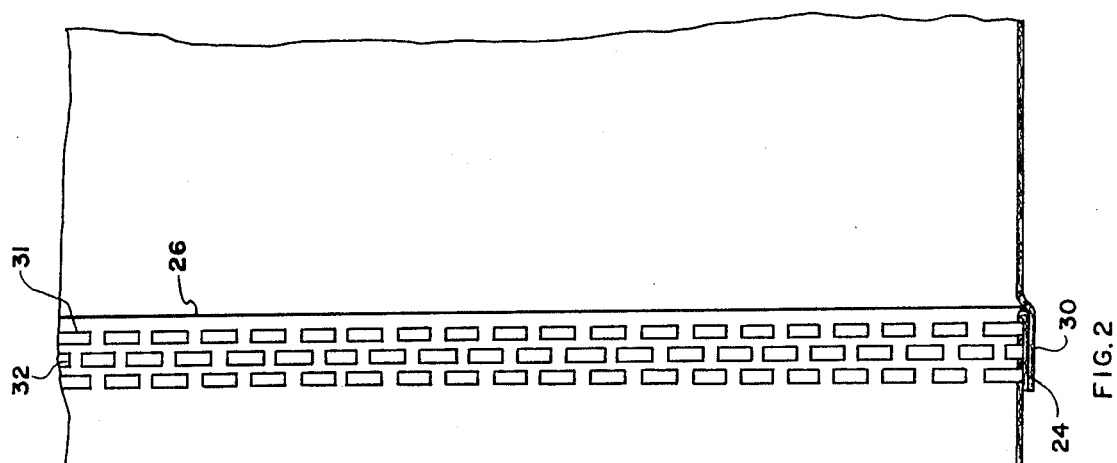
FIG. 2 is a pictorial view, partially cut away, showing a bonded seam as obtained in the second step of the method.
Figure 1:
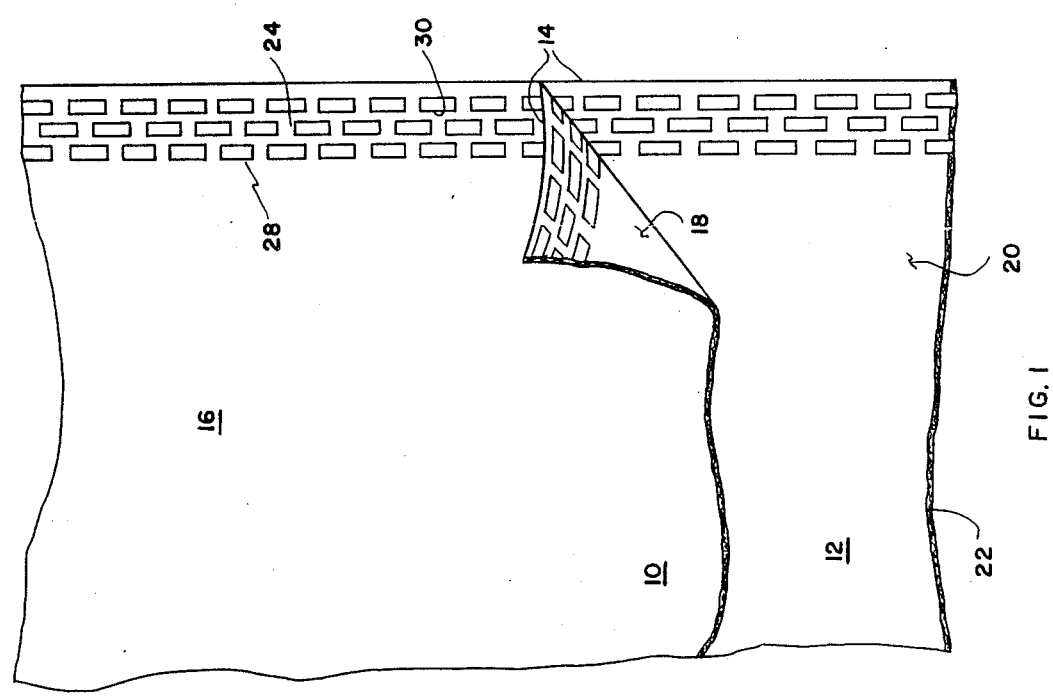
FIG. 1 is a cut-away view, partially peeled back showing a weakly bonded fabric seam obtained in the first step of the method of the invention.

Referring to FIG. 1 of the drawings, there is shown a weakly bonded seam between pieces 10 and 12 of Tyvek ™, such a seam being obtained in applicant's first bonding step. Piece 10 is stacked over piece 12 with their edges 14 in alignment with one another. Piece 10 has its rougher or "rib" side 16 on the top or outside and its smoother or "linen" side 18 disposed on the inside in contact with linen side 20 of piece 12, which has its rib side 22 on the outside of the stack. The weakly bonded seam 24 extends along the length of overlapped edges 14, slightly spaced apart therefrom. Formation of this seam may be carried out by application of heat and pressure along the path of the seam, with heat being applied continuously in the form of ultrasonic energy and pressure being applied simultaneously at predetermined spaced intervals by means such as an embossed wheel having spaced sets of serially arranged raised regions or lands. Further details of suitable conditions and equipment for performing this step may be seen by reference to applicant's above-referenced prior patent, which is incorporated herein by reference. Upon completion of this step, the two pieces are joined along line 26 between the pieces on their linen side, line 26 corresponding to the inner edge 28 of seam 4. The rib side of the joined pieces has an outward extending longitudinal strip 30 corresponding to the width of seam 24 plus any area between the seam and edges 14.

The second bonding step is carried out by application of heat and pressure in the same manner as scribed above from the linen side of the joined pieces and along a path 31 adjacent line 26, with strip 30 being folded over underneath this path. During this step, a strong and durable final seam 32 is produced, this seam in effect merging with seam 24 of the folded-over strip underneath. The characteristic pattern of raised and lowered areas imprinted by passage of the pressure-applying wheel in the first step disappears during the second bonding step, leaving only a pattern produced by the wheel in the latter step. The final seam exhibits shear, in contrast to the peel, characteristics of seam 24 obtained in the first step and provides sufficient strength for durable garment fabrication.

FIG. 3 shows a cleanroom garment 44 embodying the invention, with seams that would be subject to high stresses, specifically along the arms, legs, and sides of the body, being formed by the two-step procedure described above. As shown in FIG. 4, garment sleeve 46 has a longitudinally extending bonded seam 48 with cut edge 50 disposed on the inside of the garment and not on the outside where the cut edge 52 is folded over into the seam. Seams for areas not subject to high stresses, for example, at gathered sleeve ends 54 and trouser ends 56, may be made by using only the first step described above, with the weak bond so obtained providing adequate strength in these locations.

In addition to heir utility for cleanroom applications, garments embodying the invention may be employed as protective garments for keeping microscopic particles in a work environment from coming in contact with the worker's body or clothing. Such applications include protection from particles of asbestos, toxic dust, and radioactive materials.

While the invention is described above with respect to specific embodiments, it is not to be understood as limited to those embodiments, but only as indicated by the appended claims.

I claim:

1. The method of forming a seam joining together a pair of edge regions of a nonwoven, spunbonded polyolefin fabric having a linen side and a rib side which comprises:

placing said edge regions in stacked relation with linen sides of said fabric edge regions in contact with one another along a strip defining a seam line;

applying heat and pressure to the stacked fabric along said strip, the heat being applied continuously and the pressure being applied at spaced-apart intervals, whereby said edge regions are weakly bonded to one another along said strip;

folding said strip flat against an adjacent surface of a said edge region; and applying heat and pressure to the folded strip and the area of said edge region against which the strip is folded from the linen side of the edge region against which the strip is folded and over and along the length of said strip, the heat being applied continuously and the pressure at spaced-apart intervals, whereby a strongly bonded seam between both layers of the folded strip and the edge region against which the strip is folded is produced.

2. The method as defined in claim 1 wherein the heat applied in each bonding step is in the form of ultrasonic energy.

3. The method as defined in claim 2 wherein the pressure applied in each bonding step is applied by means of an embossed wheel.

* * * * *